United States Patent
Fujishiro et al.

(10) Patent No.: US 9,515,801 B2
(45) Date of Patent: Dec. 6, 2016

(54) MOBILE COMMUNICATION SYSTEM AND MOBILE COMMUNICATION METHOD USED IN A MOBILE COMMUNICATION SYSTEM

(71) Applicant: KYOCERA CORPORATION, Kyoto (JP)

(72) Inventors: Masato Fujishiro, Yokohama (JP); Chiharu Yamazaki, Ota-ku (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/416,132

(22) PCT Filed: Jul. 23, 2013

(86) PCT No.: PCT/JP2013/069955
§ 371 (c)(1),
(2) Date: Jan. 21, 2015

(87) PCT Pub. No.: WO2014/017503
PCT Pub. Date: Jan. 30, 2014

(65) Prior Publication Data
US 2015/0180635 A1 Jun. 25, 2015

Related U.S. Application Data

(60) Provisional application No. 61/676,785, filed on Jul. 27, 2012.

(51) Int. Cl.
*H04L 1/00* (2006.01)
*H04L 5/00* (2006.01)
(Continued)

(52) U.S. Cl.
CPC ........... *H04L 5/0055* (2013.01); *H04L 1/1854* (2013.01); *H04L 1/1861* (2013.01);
(Continued)

(58) Field of Classification Search
CPC ...... H04W 84/08; H04W 84/09; H04W 84/10; H04W 80/04; H04W 80/05; H04W 80/06; H04W 80/07; H04W 80/08; H04W 72/04; H04W 72/05; H04W 72/06
(Continued)

(56) References Cited

U.S. PATENT DOCUMENTS 8,412,107 B2    4/2013   Hamada et al.
8,626,059 B2    1/2014   Kobayashi
(Continued)

FOREIGN PATENT DOCUMENTS

JP    2011-120049 A    6/2011
JP    2012-110035 A    6/2012
(Continued)

OTHER PUBLICATIONS

International Search Report; PCT/JP2013/069955; Oct. 8, 2013.
(Continued)

*Primary Examiner* — Dady Chery
(74) *Attorney, Agent, or Firm* — Studebaker & Brackett PC

(57) ABSTRACT

A mobile communication system performs communication of user data directly among a plurality of radio terminals without passing through a radio base station. The communication of user data directly performed among the plurality of radio terminals is performed by using apart of radio resources assigned to the mobile communication system. The plurality of radio terminals comprise: a transmission-side terminal that transmits the user data; and a reception-side terminal that receives the user data. The reception-side terminal transmits to a radio base station in a connected state where a radio connection is established with the reception-side terminal, a transmission acknowledgment signal indi- (Continued)

cating whether the user data transmitted from the transmission-side terminal has been received.

9 Claims, 19 Drawing Sheets

(51) Int. Cl.
*H04L 1/18* (2006.01)
*H04W 76/02* (2009.01)
*H04W 92/18* (2009.01)

(52) U.S. Cl.
CPC ... *H04W 76/023* (2013.01); *H04L 2001/0097* (2013.01); *H04W 92/18* (2013.01)

(58) Field of Classification Search
USPC .......... 370/229, 230, 235, 328, 329, 341
See application file for complete search history.

(56) References Cited

U.S. PATENT DOCUMENTS

| | | |
|---|---|---|
| 8,738,057 B2 | 5/2014 | Fukuzawa et al. |
| 9,031,000 B2 | 5/2015 | Morimoto et al. |
| 2010/0232503 A1 | 9/2010 | Morimoto et al. |
| 2011/0034201 A1 | 2/2011 | Hamada et al. |
| 2011/0306290 A1 | 12/2011 | Fukuzawa et al. |
| 2012/0163252 A1 | 6/2012 | Ahn et al. |
| 2014/0044082 A1 | 2/2014 | Iwamura et al. |
| 2014/0086180 A1* | 3/2014 | Lee ............ H04W 16/14 370/329 |

FOREIGN PATENT DOCUMENTS

| | | |
|---|---|---|
| JP | 2012-244367 A | 12/2012 |
| WO | 2009/133740 A1 | 11/2009 |
| WO | 2010/050531 A1 | 5/2010 |

OTHER PUBLICATIONS

3GPP TS 36.300 V9.4.0 (Jun. 2010); 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 9).

An Office Action; "Notice of Reasons for Rejection," issued by the Japanese Patent Office on Feb. 9, 2016, which aorresponds to Japanese Patent Application No. 2014-526949 and is related to U.S. Appl. No. 14/416,132; with English language statement of relevance.

The extended European search report issued by the European Patent Office on Apr. 5, 2016, which corresponds to European Patent Application No. 13823338.2-1851 and is related to U.S. Appl. No. 14/416,132.

* cited by examiner

FIG. 6
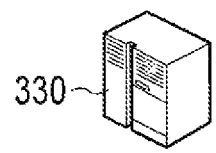
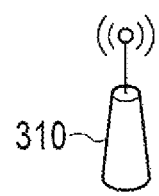
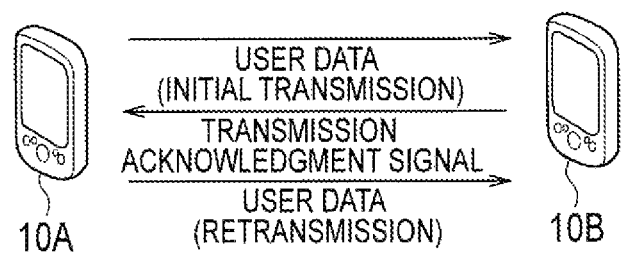

FIG. 18

TABLE 6.2.1-1 VALUES OF LCID FOR DL-SCH

| Index | LCID VALUES |
|---|---|
| 00000 | CCCH |
| 00001-01010 | IDENTITY OF THE LOGICAL CHANNEL |
| 01011 | DEDICATED ACK/NACK MAC CONTROL ELEMENT |
| 01100-11010 | RESERVED |
| 11011 | ACTIVATION/DEACTIVATION |
| 11100 | UE CONTENTION RESOLUTION IDENTITY |
| 11101 | TIMING ADVANCE COMMAND |
| 11110 | DRX COMMAND |
| 11111 | PADDING |

FIG. 19

TABLE 6.2.1-2 VALUES OF LCID FOR UL-SCH

| INDEX | LCID VALUES |
|---|---|
| 00000 | CCCH |
| 00001-01010 | IDENTITY OF THE LOGICAL CHANNEL |
| 01011 | DEDICATED ACK/NACK MAC CONTROL ELEMENT |
| 01100-11000 | RESERVED |
| 11001 | EXTENDED POWER HEADROOM REPORT |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

MOBILE COMMUNICATION SYSTEM AND MOBILE COMMUNICATION METHOD USED IN A MOBILE COMMUNICATION SYSTEM

TECHNICAL FIELD

The present invention relates to a mobile communication system in which communication of user data among a plurality of radio terminals is directly performed, and relates also to a mobile communication method used in the mobile communication system.

BACKGROUND ART

In recent years, there has been proposed a technology in which user data (data of User-Plane) is directly communicated among a plurality of radio terminals without passing through a radio base station (D2D communication). The communication of user data directly performed among the plurality of radio terminals is performed by using a part of radio resources assigned to a mobile communication system. However, in the D2D communication, the communication of control data (C-Plane) is performed via the radio base station, similarly to a conventional mobile communication system.

Meanwhile, in the D2D communication, there exists a need of considering various methods as a method for assigning a radio resource to a transmission-side terminal and a reception-side terminal.

PRIOR ART DOCUMENT

Patent Document

Patent Document 1: 3GPP TS 36.300 V9.4.0

SUMMARY OF THE INVENTION

A mobile communication system according to a first feature performs communication of user data directly among a plurality of radio terminals without passing through a radio base station. The communication of user data directly performed among the plurality of radio terminals is performed by using a part of radio resources assigned to the mobile communication system. The plurality of radio terminals comprise: a transmission-side terminal that transmits the user data; and a reception-side terminal that receives the user data. The reception-side terminal transmits to a radio base station in a connected state where a radio connection is established with the reception-side terminal, a transmission acknowledgment signal indicating whether the user data transmitted from the transmission-side terminal has been received.

A mobile communication method according to a second feature is used in a mobile communication system, in which communication of user data is directly performed among a plurality of radio terminals without passing through a radio base station. The communication of user data directly performed among the plurality of radio terminals is performed by using a part of radio resources assigned to the mobile communication system. The plurality of radio terminals comprise: a transmission-side terminal that transmits the user data; and a reception-side terminal that receives the user data. The mobile communication method includes a step of transmitting, from the reception-side terminal, to a radio base station in a connected state where a radio connection is established with the reception-side terminal, a transmission acknowledgment signal indicating whether the user data transmitted from the transmission-side terminal has been received.

BRIEF DESCRIPTION OF THE DRAWINGS

FIG. 6 is a diagram for explaining a second retransmission control example according to the first embodiment.
FIG. 18 is a diagram illustrating the control signal of the MAC layer according to the first embodiment.
FIG. 19 is a diagram illustrating the control signal of the MAC layer according to the first embodiment.

DESCRIPTION OF THE EMBODIMENT

Figure 1:
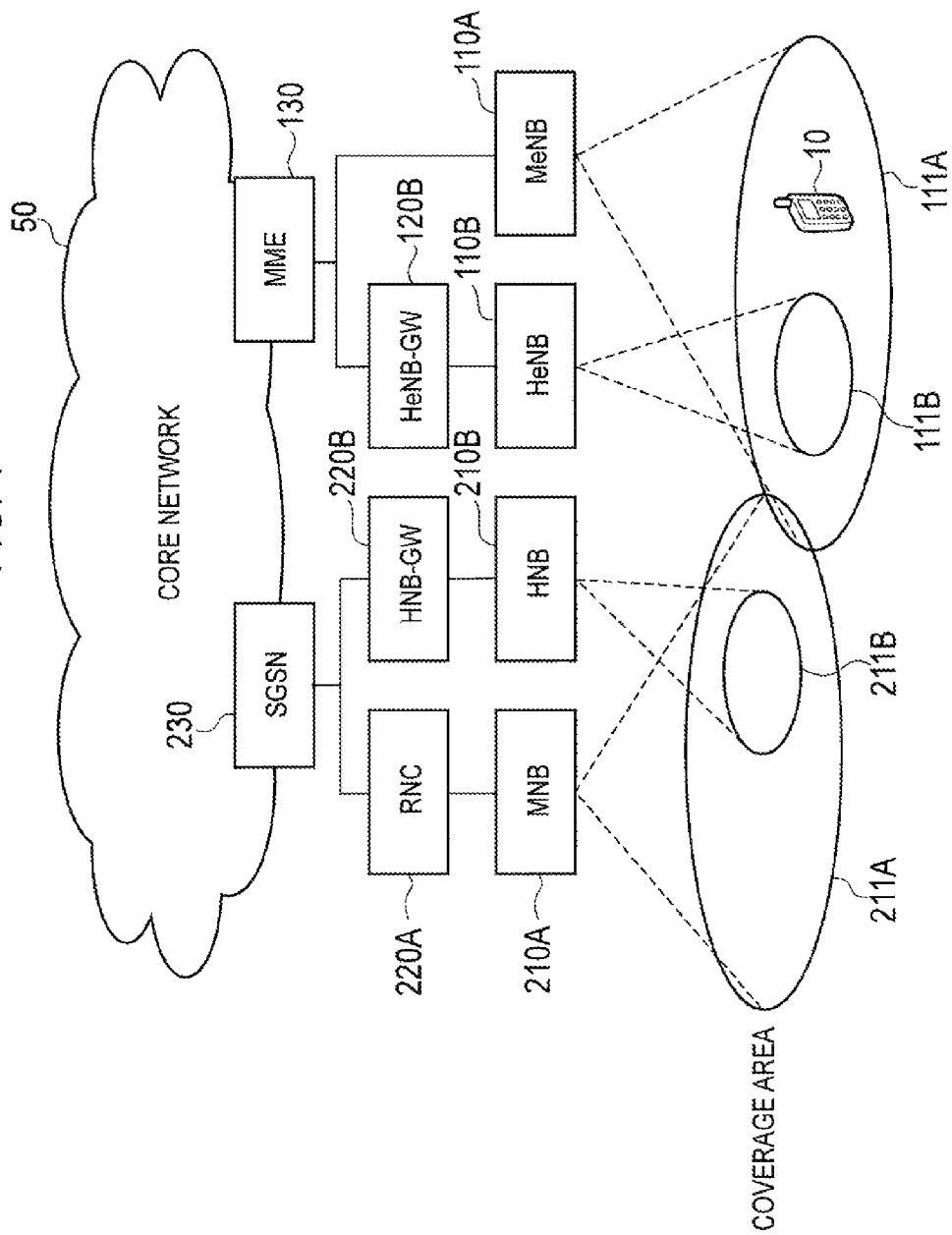
FIG. 1 is a diagram illustrating a mobile communication system 100 according to a first embodiment.

Hereinafter, a mobile communication system according to an embodiment of the present invention will be described with reference to the accompanying drawings. Note that in the descriptions of the drawing below, identical or similar symbols are assigned to identical or similar portions.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

Overview of Embodiment

A mobile communication system according to the embodiments performs communication of user data directly among a plurality of radio terminals without passing through a radio base station. The communication of user data directly performed among the plurality of radio terminals is performed by using a part of radio resources assigned to the mobile communication system. The plurality of radio terminals comprise: a transmission-side terminal that transmits the user data; and a reception-side terminal that receives the user data. The reception-side terminal transmits to a radio base station in a connected state where a radio connection is established with the reception-side terminal, a transmission acknowledgment signal indicating whether the user data transmitted from the transmission-side terminal has been received.

In the embodiments, the reception-side terminal transmits, to the radio base station in the connected state where the radio connection is established with the reception-side terminal, the transmission acknowledgment signal indicating whether user data transmitted from a transmission-side terminal has been received. Here, the radio base station in the connected state knows transport block sizes used for transmitting the user data employed in communication performed directly without passing through the radio base station, and therefore, the radio base station is able to calculate the amount of the user data on the basis of the transmission acknowledgment signal.

Furthermore, the communication directly performed among the plurality of radio terminals without passing through the radio base station may be called D2D communication. The D2D communication is performed by using a part (a D2D radio resource) of the radio resources assigned to the mobile communication system. As the D2D radio resource, for example, a part of uplink radio resources is used.

It should be noted that, in the embodiments, a radio resource used in the communication of the user data in the D2D communication is assigned by the radio base station in the connected state where the radio connection (RRC connection) is established with the plurality of radio terminals.

First Embodiment

Mobile Communication System

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, has a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) that communicates with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up a radio connection with the MeNB 110A. Furthermore, the MME 130, which is connected to the HeNB 110B via the HeNB-GW 120B, is a device that manages the mobility of the UE 10 having set up a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC Connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDSCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal that notifies a recommended modulation method and an encoding rate to be used in the downlink transmission. The PMI is a signal that indicates a preceding matrix preferably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether a signal transmitted through a downlink channel (for example, PDSCH) has been received.

The uplink shared channel is a channel that carries a control signal (including the aforementioned control signal) and/or a data signal. For example, the uplink radio resource may be assigned only to the data signal, or may be assigned such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal that indicates the assignment of the uplink radio resource. The Downlink SI is a signal that indicates the assignment of a downlink radio resource. The TPC bit is a signal that instructs to increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal that is transmitted through a channel other than the downlink control channel (PDCCH) and the downlink shared channel (PDSCH) includes the ACK/NACK. The ACK/NACK is a signal that indicates whether a signal transmitted through an uplink channel (for example, PUSCH) has been received.

In addition, the general cell and the specific cell broadcast information through a broadcast channel (BCCH; Broadcast Control Channel). The broadcast information, for example, is information such as MIB (Master Information Block) and SIB (System. Information Block).

Specifically not illustrated in FIG. 1, the first communication system may include a relay node that relays data communication between the MeNB 110A (or the HeNB 110B) and the UE 10. Similarly, the second communication system may include a relay node that relays data communication with the MNB 210A (or the HNB 210B).

(Radio Frame)

Figure 2:
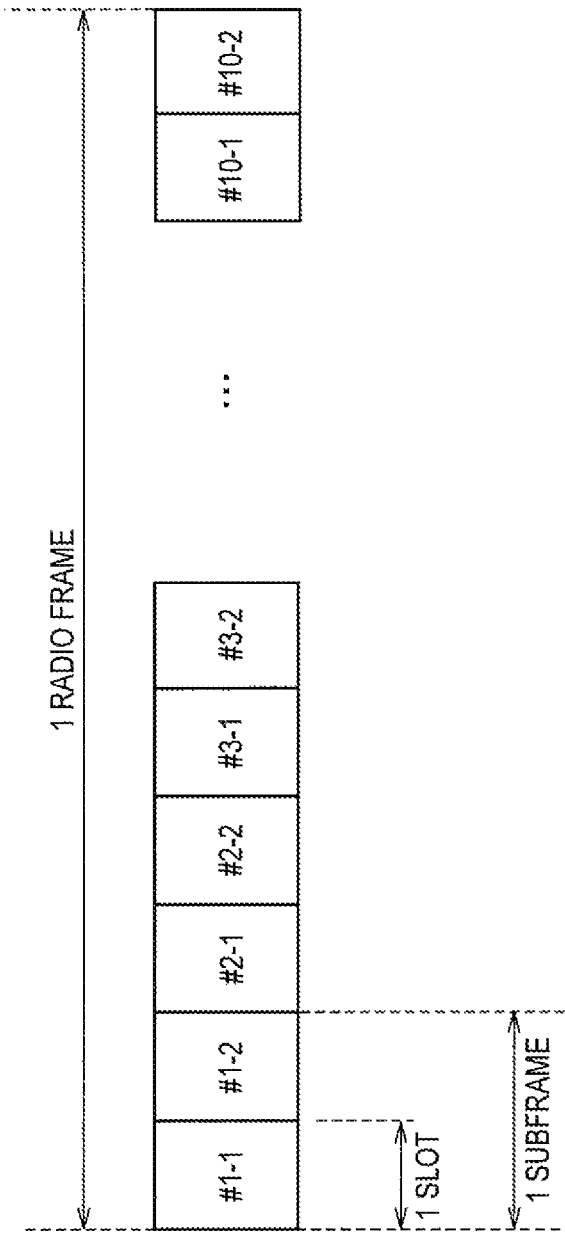
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
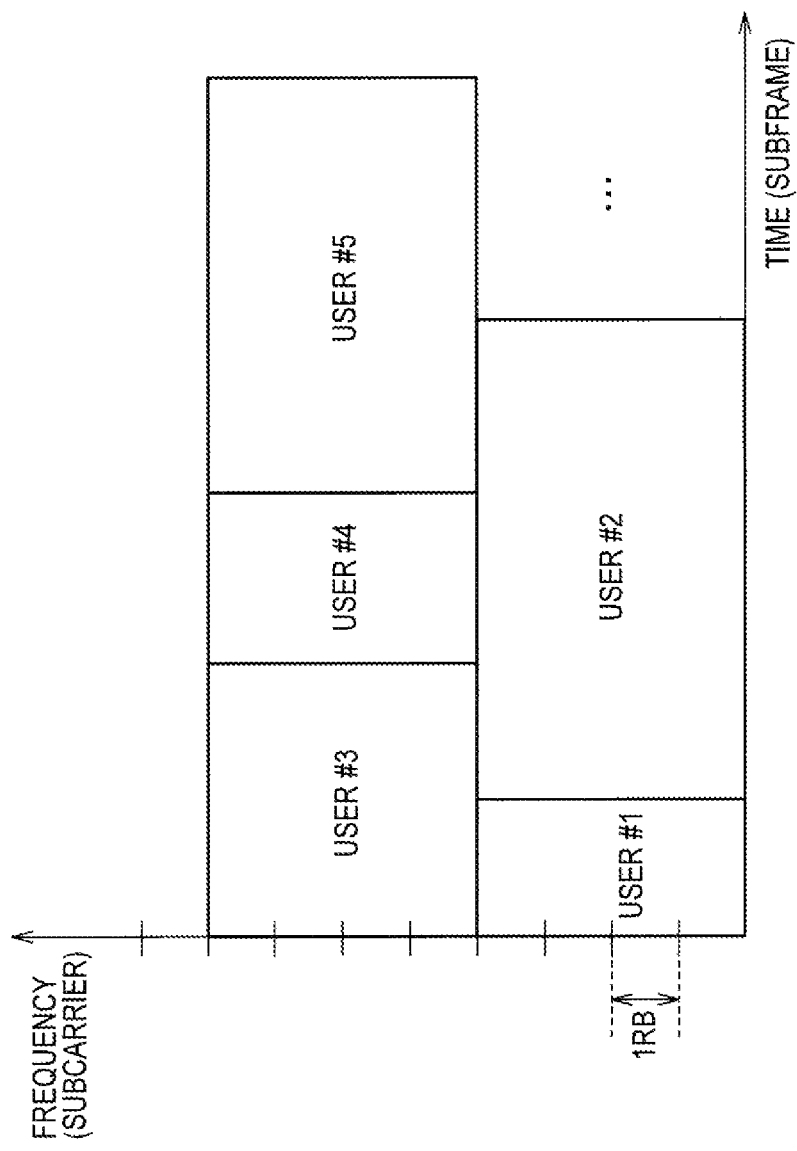
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, and the radio frame, as described above.

Here, the radio resource is assignable to each one resource block. Furthermore, on the frequency axis and the time axis, it is possible to divide and assign the radio resources to a plurality of users (for example, a user #1 to a user #5).

Furthermore, the radio resource is assigned by the MeNB 110A. The MeNB 110A assigns the radio resources to each UE 10 on the basis of the CQI, the PMI, the RI and the like.

(Application Case)

Figure 4:
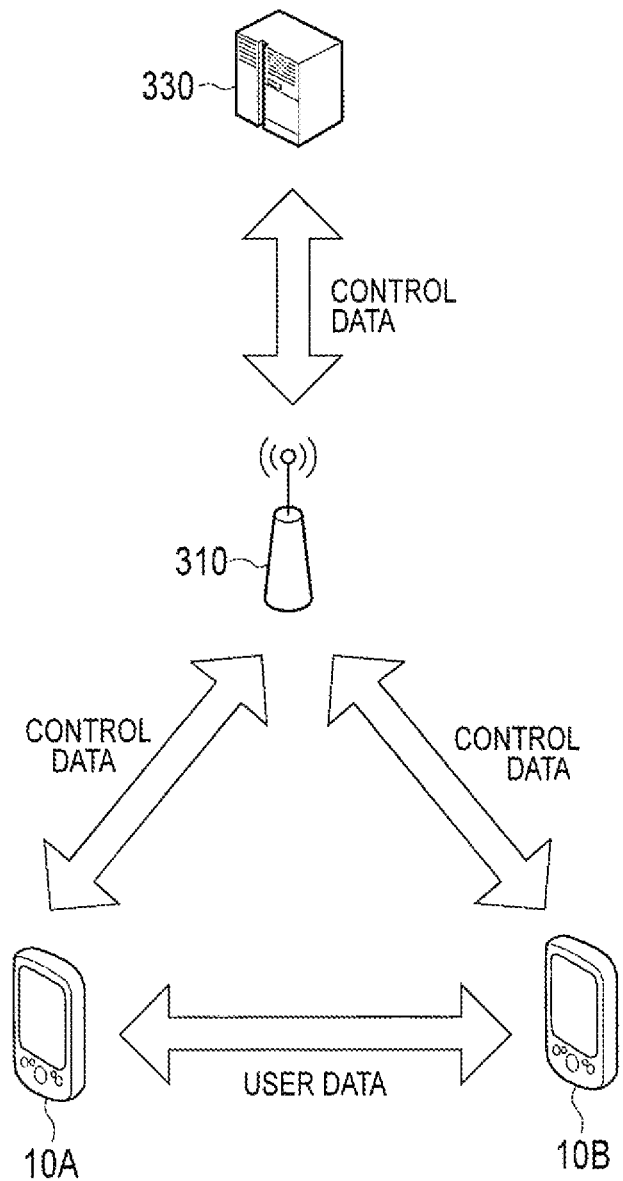
FIG. 4 is a diagram illustrating a case where the first embodiment is applied.

Hereinafter, the application case according to the first embodiment will be described. FIG. 4 is a diagram for explaining the application case according to the first embodiment. In FIG. 4, as the UE 10, the UE 10A and the UE 10B are illustrated. It is preferable that a radio base station 310 is the MeNB 110A or the HeNB 110B. However, the radio base station 310 may be the MNB 210A or the HNB 210B. Alternatively, the radio base station 310 may be a relay node. A network device 330 is a device provided in the core network 50. The network device 330 may be the MME 130 or the SGSN 230.

As illustrated in FIG. 4, the communication of user data (data of User-Plane) is directly performed among a plurality of radio terminals without passing through a radio base station (hereinafter, D2D communication). Meanwhile, the communication of control data (C-Plane) is performed via the radio base station, similarly to that in a conventional mobile communication system.

Furthermore, the D2D communication is performed by using a part (hereinafter, a D2D radio resource) of radio resources assigned to the mobile communication system. As the D2D radio resource, for example, a part of uplink radio resources is used. It should be noted that the radio resource used in the communication of the user data in the D2D communication is assigned by the radio base station (radio base station 310) in a connected state where a radio connection is established with radio terminals (the transmission-side terminal and the reception-side terminal).

For example, it is preferable that the D2D radio resource is broadcast from each cell managed by the radio base station. The D2D radio resources, for example, may be included in (Master Information Block) or SIB (System Information Block).

(First Retransmission Control Example)

Figure 5:
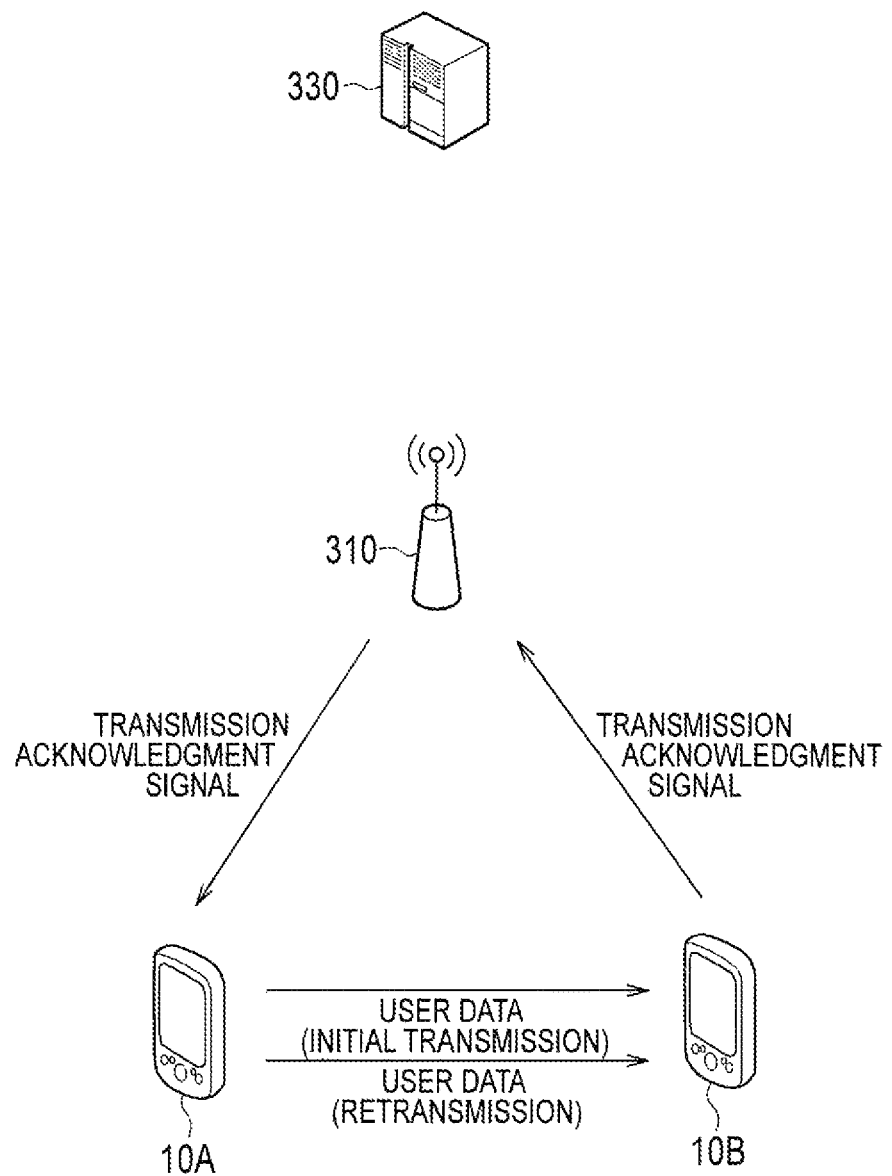
FIG. 5 is a diagram for explaining a first retransmission control example according to the first embodiment.

Hereinafter, a first retransmission control example according to the first embodiment will be described. FIG. 5 is a diagram for explaining the first retransmission control example according to the first embodiment. In FIG. 5, as the UE 10, the UE 10A and the UE 10B are illustrated. The UE 10A is an example of a transmission-side terminal and the UE 10B is an example of a reception-side terminal.

As illustrated in FIG. 5, the UE 10B transmits, to the radio base station 310, a transmission acknowledgment signal (ACK/NACK) indicating whether user data transmitted from the UE 10A has been received. In response to the transmission acknowledgment signal received from the UE 10B, the radio base station 310 transmits the transmission acknowledgment signal to the UE 10A. For example, the radio base station 310 may relay the transmission acknowledgment signal, which is received from the UE 10B, to the UE 10A. Alternatively, the radio base station 310 may transmit the transmission acknowledgment signal to the UE 10A, together with a signal for assigning a radio resource used in the communication of the user data in the D2D communication to the UE 10A. When the transmission acknowledgment signal is NACK indicating that it is not possible to receive the user data, the UE 10A retransmits the user data to the UE 10B.

It should be noted that, as described above, the first retransmission control example is the case in which the UE 10A (the transmission-side terminal) performs retransmission control.

(Second Retransmission Control Example)

Hereinafter, a second retransmission control example according to the first embodiment will be described. FIG. 6 is a diagram for explaining the second retransmission control example according to the first embodiment. In FIG. 6, as the UE 10, the UE 10A and the UE 10B are illustrated. The UE 10A is an example of a transmission-side terminal and the UE 10B is an example of a reception-side terminal.

As illustrated in FIG. 6, the UE 10B transmits, to the UE 10A, a transmission acknowledgment signal (ACK/NACK) indicating whether user data transmitted from the UE 10A has been received. When the transmission acknowledgment signal is NACK indicating that it is not possible to receive the user data, the UE 10A retransmits the user data to the UE 10B.

It should be noted that, as described above, the second retransmission control example is the case in which the UE 10A (the transmission-side terminal) performs retransmission control.

(Third Retransmission Control Example)

Figure 7:
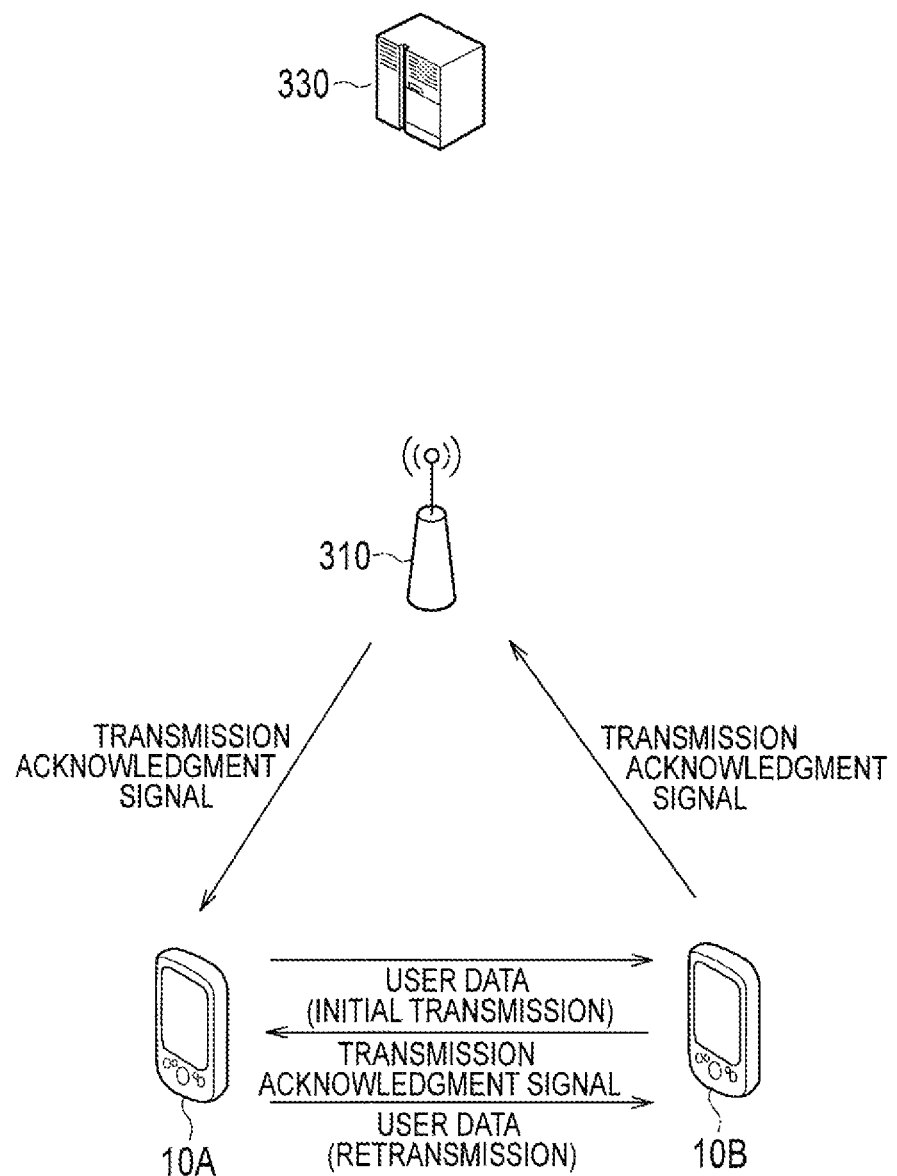
FIG. 7 is a diagram for explaining a third retransmission control example according to the first embodiment.

Hereinafter, a third retransmission control example according to the first embodiment will be described. FIG. 7 is a diagram for explaining the third retransmission control example according to the first embodiment. In FIG. 7, as the UE 10, the UE 10A and the UE 10B are illustrated. The UE 10A is an example of a transmission-side terminal and the UE 10B is an example of a reception-side terminal.

As illustrated in FIG. 7, the UE 10B transmits, to the UE 10A and the radio base station 310, a transmission acknowledgment signal (ACK/NACK) indicating whether user data transmitted from the UE 10A has been received. In response to the transmission acknowledgment signal received from the UE 10B, the radio base station 310 transmits the transmission acknowledgment signal to the UE 10A. For example, the radio base station 310 may relay the transmission acknowledgment signal, which is received from the UE 10B, to the UE 10A. Alternatively, the radio base station 310 may transmit the transmission acknowledgment signal to the UE 10A, together with a signal for assigning a radio resource used in the communication of the user data in the D2D communication to the UE 10A. The UE 10A performs retransmission control of the user data on the basis of the transmission acknowledgment signal received from the UE 10B and the transmission acknowledgment signal received via the radio base station 310.

For example, when one of the transmission acknowledgment signals received from the UE 10B and the radio base station 310 is NACK, the UE 10A retransmits the user data to the UE 10B. Alternatively, when a communication state of the user data directly communicated between the UE 10A and the UE 10B is good, the UE 10A may refer to the transmission acknowledgment signal received from the UE 10B without referring to the transmission acknowledgment signal received via the radio base station 310. In such a case, it is preferable that the UE 10A notifies the radio base station 310 of whether to refer to the transmission acknowledgment signal received via the radio base station 310. When the radio base station 310 is notified of the fact that the transmission acknowledgment signal is not referred, it is preferable that the radio base station 310 omits the transmission of the transmission acknowledgment signal to the UE 10A.

Alternatively, when the communication state of the user data directly communicated between the UE 10A and the UE 10B is good, the UE 10B may omit the transmission of the transmission acknowledgment signal to the radio base station 310. In other words, when the communication state of the user data directly communicated between the UE 10A and the UE 10B is poor, the UE 10B transmits the transmission acknowledgment signal to the radio base station 310.

Furthermore, the case in which the communication state is good includes the case in which transmission power used for the communication of the user data becomes less than a threshold value, or the case in which a modulation coding scheme used for the communication of the user data exceeds a threshold value. Alternatively, the case in which the communication state is good may include the case in which a block error rate becomes less than a threshold value, the case in which a packet error rate becomes less than a threshold value, the case in which QoS is satisfied, the case in which CQI exceeds a threshold value, and the case in which a processing load of the UE 10A becomes less than a threshold value.

Furthermore, the case in which the communication state is poor includes the case in which the transmission power used for the communication of the user data exceeds the threshold value, or the case in which the modulation coding scheme used for the communication of the user data becomes less than the threshold value. Alternatively, the case in which the communication state is poor may include the case in which the block error rate exceeds the threshold value, the case in which the packet error rate exceeds the threshold value, the case in which the QoS is not satisfied, the case in which the CQI becomes less than the threshold value, and the case in which the processing load of the UE 10A exceeds the threshold value.

It should be noted that, as described above, the third retransmission control example is the case in which the UE 10A (the transmission-side terminal) performs retransmission control.

(Fourth Retransmission Control Example)

Figure 8:
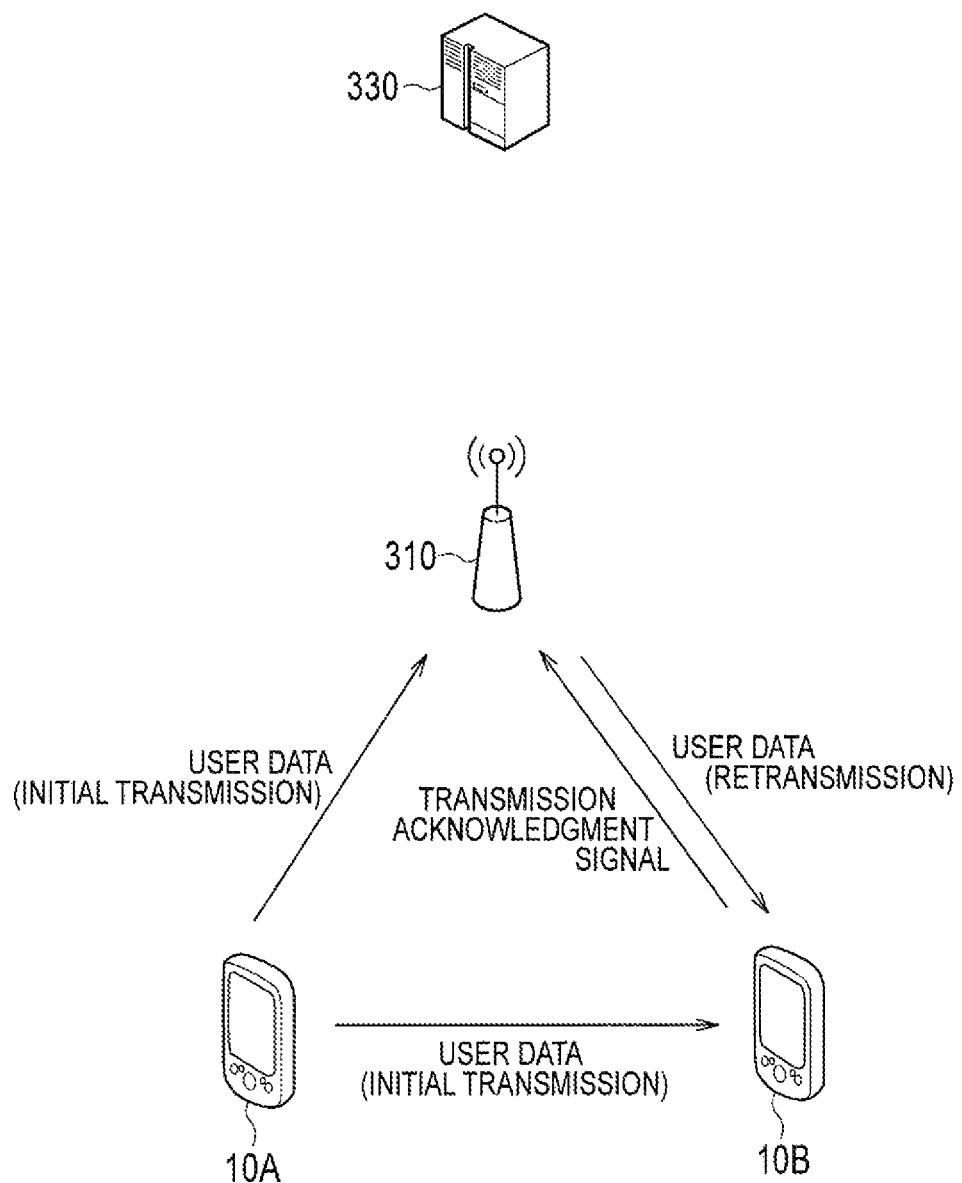
FIG. 8 is a diagram for explaining a fourth retransmission control example according to the first embodiment.

Hereinafter, a fourth retransmission control example according to the first embodiment will be described. FIG. 8 is a diagram for explaining the fourth retransmission control example according to the first embodiment. In FIG. 8, as the UE 10, the UE 10A and the UE 10B are illustrated. The UE 10A is an example of a transmission-side terminal and the UE 10B is an example of a reception-side terminal.

As illustrated in FIG. 8, the UE 10B transmits, to the radio base station 310, a transmission acknowledgment signal (ACK/NACK) indicating whether user data transmitted from the UE 10A has been received. The radio base station 310 assigns a radio resource, which is assigned to the communication of the user data directly communicated between the UE 10A and the UE 10B, as a reception resource for receiving the user data. In this way, the radio base station 310 is able to receive the user data transmitted from the UE 10A to the UE 10B. When the transmission acknowledgment signal is NACK indicating that it is not possible to receive the user data, the radio base station 310 retransmits the user data to the UE 10B.

It should be noted that, as described above, the fourth retransmission control example is the case in which the radio base station 310 performs retransmission control.

(Fifth Retransmission Control Example)

Figure 9:
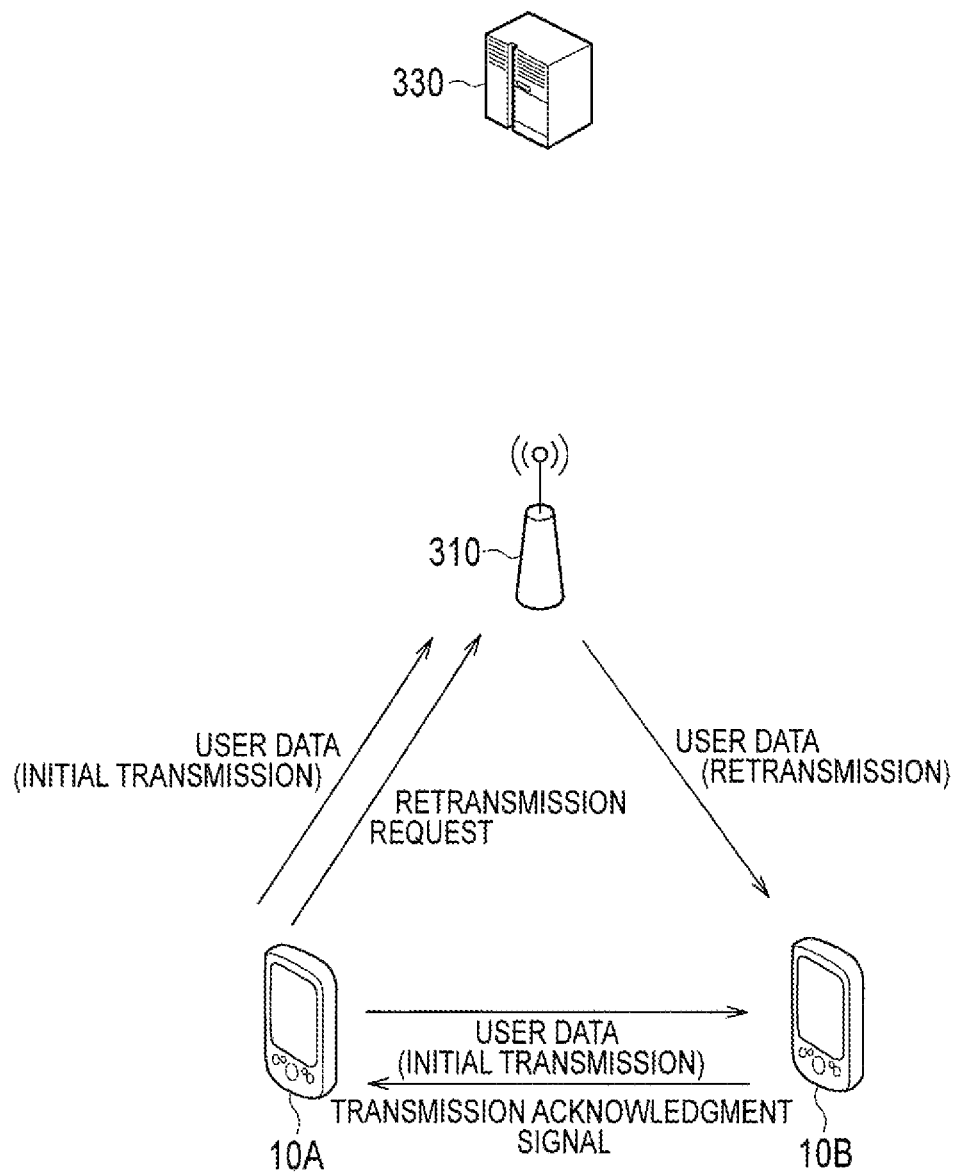
FIG. 9 is a diagram for explaining a fifth retransmission control example according to the first embodiment.

Hereinafter, a fifth retransmission control example according to the first embodiment will be described. FIG. 9 is a diagram for explaining the fifth retransmission control example according to the first embodiment. In FIG. 9, as the UE 10, the UE 10A and the UE 10B are illustrated. The UE 10A is an example of a transmission-side terminal and the UE 10B is an example of a reception-side terminal.

As illustrated in FIG. 9, the UE 10B transmits, to the UE 10A, a transmission acknowledgment signal (ACK/NACK) indicating whether user data transmitted from the UE 10A has been received. When the transmission acknowledgment signal is NACK indicating that it is not possible to receive the user data, the UE 10A transmits a retransmission request of the user data to the radio base station 310. The radio base station 310 assigns a radio resource, which is assigned to the communication of the user data directly communicated between the UE 10A and the UE 10B, as a reception resource for receiving the user data. In this way, the radio base station 310 is able to receive the user data transmitted from the UE 10A to the UE 10B. When the retransmission request is received, the radio base station 310 retransmits the user data to the UE 10B.

It should be noted that, as described above, the fifth retransmission control example is the case in which the radio base station 310 performs retransmission control.

(Reception Resource)

Figure 10:
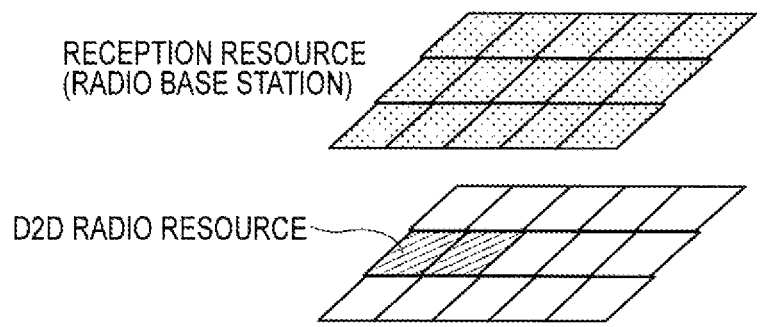
FIG. 10 is a diagram for explaining a reception resource according to the first embodiment.
Figure 11:
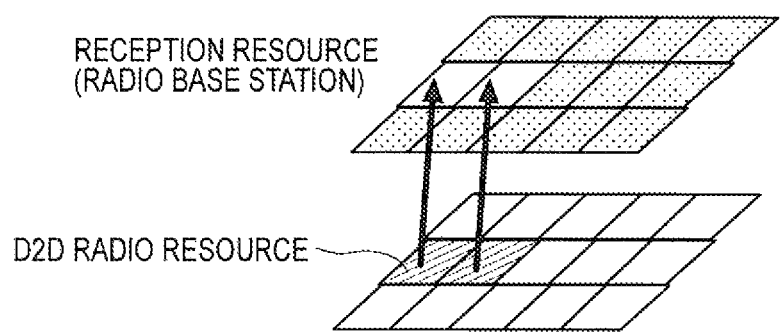
FIG. 11 is a diagram for explaining the reception resource according to the first embodiment.

Hereinafter, the reception resource according to the first embodiment will be described. FIG. 10 and FIG. 11 are diagrams for explaining the reception resource according to the first embodiment.

As illustrated in FIG. 10, when the radio resource assigned to the D2D communication is not assigned as the reception resource for receiving the user data transmitted from the UE 10A to the UE 10B, the radio base station 310 is not able to receive the user data transmitted from the UE 10A to the UE 10B. In such a case, the radio base station 310 is able to receive uplink user data from another UE 10 by using the radio resource assigned to the D2D communication.

As illustrated in FIG. 11, when the radio resource assigned to the D2D communication is assigned as the reception resource for receiving the user data transmitted from the UE 10A to the UE 10B, the radio base station 310 is able to receive the user data transmitted from the UE 10A to the UE 10B. In such a case, the radio base station 310 is not able to receive uplink user data from another UE 10 by using the radio resource assigned to the D2D communication.

(Transmission-Side Terminal)

Figure 12:
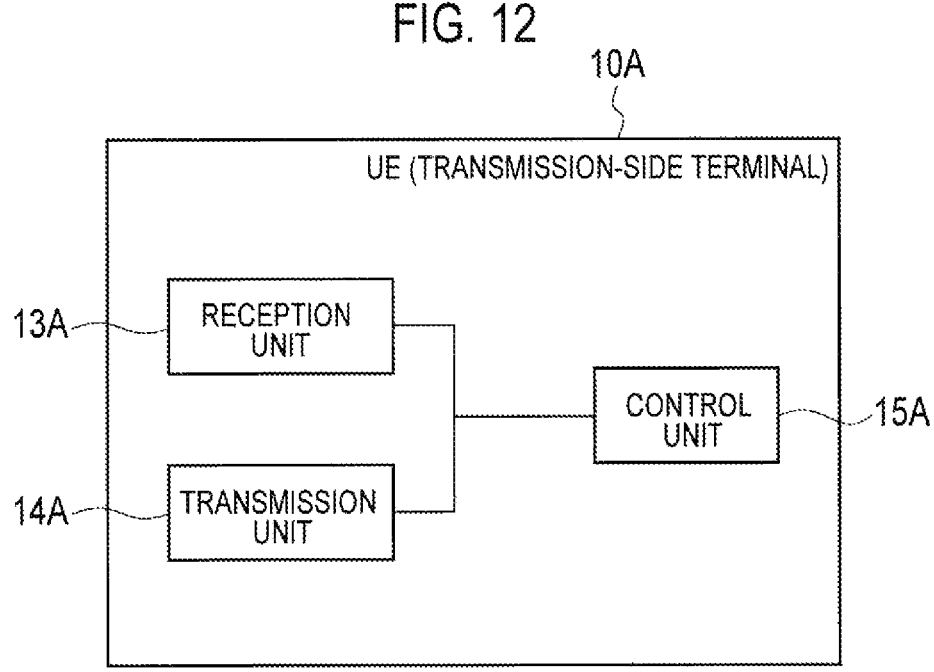
FIG. 12 is a diagram illustrating UE 10A (transmission-side terminal) according to the first embodiment.

Hereinafter, the transmission-side terminal according to the first embodiment will be described. Furthermore, as the transmission-side terminal, the UE 10A is illustrated. FIG. 12 is a block diagram illustrating the UE 10A according to the first embodiment.

As illustrated in FIG. 12, the UE 10A includes a reception unit 13A, a transmission unit 14A, and a control unit 15A.

The reception unit 13A receives data from the radio base station 310 in cellular communication. The reception unit 13A receives data from the UE 10B in the D2D communication. For example, in the D2D communication the reception unit 13A may receive, from the UE 10B, a transmission acknowledgment signal (ACK/NACK) indicating whether user data has been received. As described above, the reception unit 13A may receive the transmission acknowledgment signal via the radio base station 310 in the D2D communication.

In the embodiment, the reception unit 13A acquires target received power of the user data used in the D2D communication from the radio base station 310, before the start of the D2D communication. The target received power may be broadcast from the radio base station 310 by using a broadcast channel such as the SIB, and be transmitted from the radio base station 310 by using a dedicated control channel such as the PDCCH. The target received power is also called as "Nominal Power for D2D".

Here, it is preferable that the target received power is set according to the type of the cells (such as a macro cell, a pico cell, a femto cell, and a CSG cell) managed by the radio base station 310. Alternatively, the target received power may be set according to a UE category of the UE 10A or of the UE 10B. Also, the target received power may be set according to a subscriber contract of the UE 10A or of the UE 10B. Moreover, the target received power may be set according to a location of the UE 10A or of the UE 10B.

In the embodiment, the reception unit 13A acquires assignment information of a radio resource used in the D2D communication from the radio base station 310. When the D2D communication is performed by using an uplink radio resource, the assignment information of the radio resource is existing uplink scheduling information (Uplink SI) used in the cellular communication. The uplink scheduling information is transmitted from the radio base station 310 by using the dedicated control channel such as the PDCCH. The uplink scheduling information is also called as "Uplink Scheduling Grant". However, it should be noted that the uplink scheduling information is extended as below.

Here, the uplink scheduling information includes at least one of: information indicating the uplink radio resource assigned to the UE 10A; information indicating whether a transmission acknowledgment signal, which indicates whether it was possible to receive the user data transmitted from the UE 10A, is notified via the radio base station 310; information indicating a power control method used in the D2D communication; and information indicating received power generated when the UE 10B receives the user data transmitted from the UE 10A.

The information indicating the uplink radio resource assigned to the UE 10A is information such as information indicating an uplink resource block used in the D2D communication, a transport format, information on HARQ (Hybird Automatic Repeat Request), and information on a spatial multiplexing method.

The information indicating whether the transmission acknowledgment signal is notified via the radio base station 310 is information indicating whether the transmission acknowledgment signal (ACK/NACK) is notified from the UE 10B or whether the transmission acknowledgment signal (ACK/NACK) is notified from the radio base station 310.

The information indicating the power control method used in the D2D communication includes an identifier for identifying the TPC (Transmission Power Control) bit used in the D2D communication, an increased step width of the transmission power increasing in response to the reception of the TPC bit (UP), and a decreased step width of the transmission power decreasing in response to the reception of the TPC bit (DOWN).

The information indicating the received power generated when the UE 10B receives the user data transmitted from the UE 10A is information indicating received power of the user data measured by the UE 10B. The information indicating the received power of the user data measured by the UE 10B is notified to the UE 10A by the UE 10B via the radio base station 310.

Here, for example, it is preferable that the uplink scheduling information is transmitted by a subframe that is a predetermined number (for example, four) of subframes before the subframe by which the user data is transmitted in the D2D communication.

The transmission unit 14A transmits data to the radio base station 310 in the cellular communication. The transmission unit 14A transmits data to the UE 10B in the D2D communication. For example, the transmission unit 14A transmits user data to the UE 10B in the D2D communication. Furthermore, the transmission unit 14A retransmits the user data to the UE 10B in response to an instruction output from the control unit 15A.

Furthermore, as described in the aforementioned fifth retransmission control example, when the transmission acknowledgment signal is NACK indicating that it is not possible to receive the user data, the transmission unit 14A may transmit a retransmission request of the user data to the radio base station 310.

The control unit 15A controls the UE 10A. Specifically, the control unit 15A controls the D2D communication, on the basis of the uplink scheduling information received from the radio base station 310. For example, the control unit 15A controls the transmission unit 14A so as to transmit user data to the UE 10B, on the basis of the information indicating the uplink radio resource assigned to the UE 10A. The control unit 15A controls the reception unit 13A so as to appropri-
ately receive a transmission acknowledgment signal, on the basis of the information indicating whether the transmission acknowledgment signal is notified via the radio base station 310. The control unit 15A receives the TPC bit from the radio base station 310 or the UE 10B and controls transmission power of the user data transmitted to the UE 10B, on the basis of the information indicating the power control method used in the D2D communication. The control unit 15A calculates path loss between the UE 10A and the UE 10B, on the basis of the information indicating the received power generated when the UE 10B receives the user data transmitted from the UE 10A, and the transmission power of the user data.

In addition, the control unit 15A determines whether to retransmit the user data to the UE 10B, on the basis of the transmission acknowledgment signal directly received from the UE 10B or received via the radio base station 310. That is, the control unit 15A performs retransmission control of the user data. When determining to retransmit the user data, the control unit 15A instructs the transmission unit 14A to retransmit the user data.

(Reception-Side Terminal)

Figure 13:
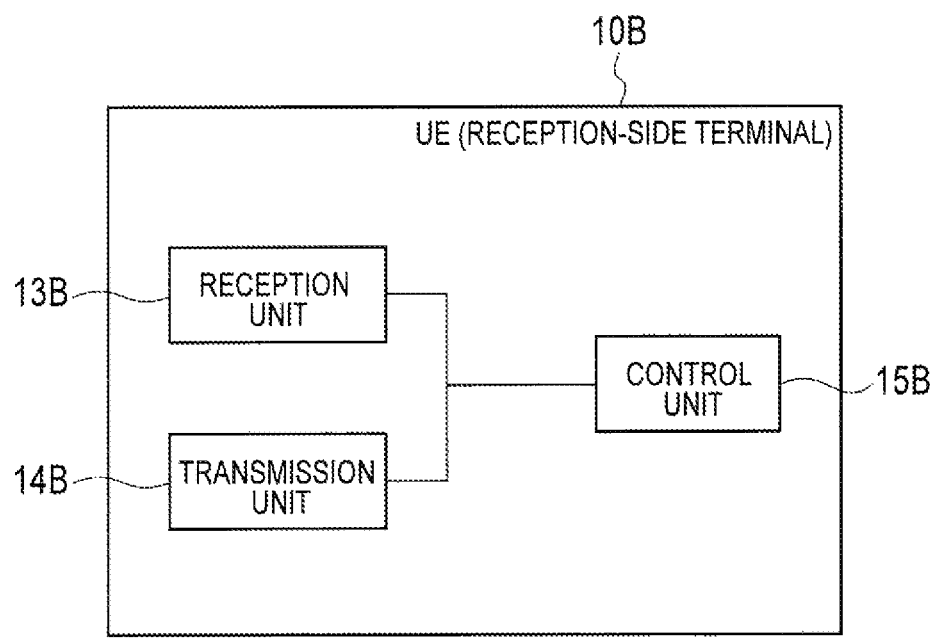
FIG. 13 is a diagram illustrating UE 10B (reception-side terminal) according to the first embodiment.

Hereinafter, the reception-side terminal according to the first embodiment will be described. Furthermore, as the transmission-side terminal, the UE 10B is illustrated. FIG. 13 is a block diagram illustrating the UE 10B according to the first embodiment.

As illustrated in FIG. 13, the UE 10B includes a reception unit 13B, a transmission unit 14B, and a control unit 15B.

The reception unit 13B receives data from the radio base station 310 in the cellular communication. The reception unit 13B receives data from the UE 10A in the D2D communication. For example, in the D2D communication, the reception unit 13B receives user data (initial transmission) transmitted from the UE 10A. Furthermore, the reception unit 13B receives the user data (retransmission) retransmitted from the UE 10A.

In the embodiment, the reception unit 13B acquires target received power of the user data used in the D2D communication from the radio base station 310, before the start of the D2D communication. The target received power may be broadcast from the radio base station 310 by using a broadcast channel such as the SIB, and be transmitted from the radio base station 310 by using a dedicated control channel such as the PDCCH. The target received power is also called as "Nominal Power for D2D".

In the embodiment, the reception unit 13B acquires assignment information of a radio resource used in the D2D communication from the radio base station 310. When the D2D communication is performed by using an uplink radio resource, the assignment information of the radio resource is D2D scheduling information different from existing uplink scheduling information (Uplink SI) used in the cellular communication. It should be noted that the D2D scheduling information is scheduling information used in the D2D communication. The D2D scheduling information is transmitted from the radio base station 310 by using the dedicated control channel such as the PDCCH. The D2D scheduling information is also called as "D2D Scheduling Grants".

Here, the D2D scheduling information includes at least one of: information indicating that the uplink radio resource is used as a reception resource in the D2D communication; an identifier of the UE 10A; information indicating the uplink radio resource assigned to the UE 10A; information indicating whether a transmission acknowledgment signal, which indicates whether the user data transmitted from the UE 10A has been received, is notified via the radio base station 310; information requesting reception in the frequency band and/or at the timing of the uplink radio resource used as the reception resource in the D2D communication; and information indicating the power control method used in the D2D communication.

The transmission unit 14B transmits data to the radio base station 310 in the cellular communication. The transmission unit 14A transmits data to the UE 10A in the D2D communication. For example, the transmission unit 14B may transmit, to the UE 10A, a transmission acknowledgment signal (ACK/NACK) indicating whether the user data has been received. In the first embodiment, the transmission unit 14B may transmit the transmission acknowledgment signal (ACK/NACK) to the radio base station 310 in the D2D communication.

Here, the transmission acknowledgment signal (ACK/NACK) includes a transmission acknowledgment signal included in a control signal of an L1/L2 layer and a transmission acknowledgment signal (MAC Control Element) included in a control signal of a MAC layer. In addition, it should be noted that the MAC layer is an upper layer of the L1/L2 layer.

It should be noted that, in the case in which the transmission acknowledgment signal (ACK/NACK) is included in the control signal of the L1/L2 layer, the transmission acknowledgment signal is configured by a bit indicating whether the user data has been received, and does not include an identifier of a notification destination (UE 10A) and an identifier of a notification source (UE 10B) of the transmission acknowledgment signal. By using the control signal of the L1/L2 layer, it is possible to obtain a merit that small modification is required for an existing system and overheads are low due to the transmission of the transmission acknowledgment signal. However, rules are needed to be determined in advance, for timing of transmitting the transmission acknowledgment signal and the like. These rules, for example, include a rule that the transmission acknowledgment signal is transmitted by a subframe that is a predetermined number (for example, four) of subframes after the subframe by which the user data is transmitted in the D2D communication.

In the case in which the transmission acknowledgment signal is included in the control signal of the MAC layer, it is possible to include the identifier of the notification destination (UE 10A) and the identifier of the notification source (UE 10B) of the transmission acknowledgment signal, in addition to the bit indicating whether the user data has been received. In this way, it is possible to have flexibility in function extensions though the overheads of the transmission acknowledgment signal increase. For example, it is possible to transmit the transmission acknowledgment signal sent to a plurality of pieces of communication (such as the cellular communication and the D2D communication, and two pieces of the D2D communication) by one subframe.

The control unit 15B controls the UE 10B. Specifically, the control unit 15B controls the D2D communication, on the basis of the D2D scheduling information received from the radio base station 310. For example, the control unit 15B controls the reception unit 13B so as to receive user data from the UE 10A, on the basis of the information indicating the uplink radio resource assigned to the UE 10A. The control unit 15B controls the transmission unit 14B so as to appropriately transmit a transmission acknowledgment signal, on the basis of the information indicating whether the transmission acknowledgment signal is notified via the radio base station 310. The control unit 15B transmits the TPC bit to the radio base station 310 or the UE 10A, on the basis of the information indicating the power control method used in the D2D communication.

In addition, the control unit 15B determines whether the user data transmitted from the UE 10A has been received, and instructs the transmission unit 14B to transmit the transmission acknowledgment signal. More particularly, when the user data has been received, the control unit 15B instructs the transmission unit 14B to transmit ACK. Meanwhile, when it is not possible to receive the user data, the control unit 15B instructs the transmission unit 14B to transmit NACK.

(Radio Base Station)

Figure 14:
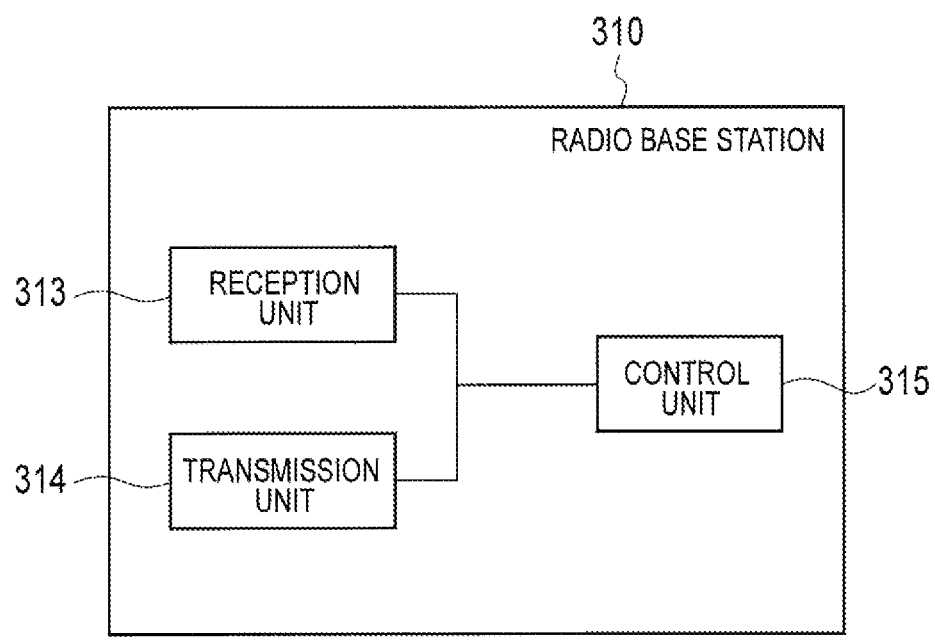
FIG. 14 is a diagram illustrating a radio base station 310 according to the first embodiment.

Hereinafter, the radio base station according to the first embodiment will be described. FIG. 14 is a block diagram illustrating the radio base station 310 according to the first embodiment.

As illustrated in FIG. 14, the radio base station 310 includes a reception unit 313, a transmission unit 314, and a control unit 315.

The reception unit 313 receives data from the UE 10. For example, in the D2D communication, the reception unit 313 receives, from the UE 10B, a transmission acknowledgment signal (ACK/NACK) indicating whether user data has been received. Furthermore, the reception unit 313 may receive the user data transmitted from the UE 10A to the UE 10B.

The transmission unit 314 transmits data to the UE 10. For example, in the D2D communication, in response to the transmission acknowledgment signal (ACK/NACK) received from the UE 10B, the transmission unit 314 transmits the transmission acknowledgment signal to the UE 10A. For example, the transmission unit 314 may relay the transmission acknowledgment signal, which is received from the UE 10B, to the UE 10A. Alternatively, the transmission unit 314 may transmit the transmission acknowledgment signal to the UE 10A, together with a signal (Uplink scheduling grants) for assigning a radio resource used in the communication of the user data in the D2D communication to the UE 10A. Also, the transmission unit 314 may include information indicating that the radio resource is assigned to either the initial transmission or the retransmission, in the signal (Uplink scheduling grants) for assigning the radio resource used in the communication of the user data in the D2D communication to the UE 10A. Moreover, the transmission unit 314 may transmit the transmission acknowledgment signal to the UE 10A, by using the "Uplink Scheduling Grants" different from the PDCCH, such as PHICH (Physical Hybrid-ARQ Indicator Channel).

Furthermore, in the D2D communication, when NACK indicating that it is not possible to receive the user data is received from the UE 10B, the transmission unit 314 retransmits the user data to the UE 10B. Alternatively, in the D2D communication, when a retransmission request is received from the UE 10A, the transmission unit 314 retransmits the user data to the UE 10B.

In the embodiment, the transmission unit 314 notifies the UE 10A and the UE 10B of target received power of the user data used in the D2D communication, before the start of the D2D communication. The transmission unit 314 may broadcast the target received power by using a broadcast channel such as the SIB, and transmit the target received power to the UE 10A and the UE 10B by using a dedicated control channel such as the PDCCH. The target received power is also called as "Nominal Power for D2D".

In the embodiment, the transmission unit 314 notifies the UE 10A of assignment information of the radio resource used in the D2D communication. When the D2D communication is performed by using an uplink radio resource, the assignment information of the radio resource is existing uplink scheduling information (Uplink SI) used in the cellular communication. The transmission unit 314 transmits the uplink scheduling information to the UE 10A by using the dedicated control channel such as the PDCCH. The uplink scheduling information is also called as "Uplink Scheduling Grant". However, it should be noted that the uplink scheduling information is extended as below.

Here, as described above, the uplink scheduling information includes at least one of: the information indicating the uplink radio resource assigned to the UE 10A; the information indicating whether the transmission acknowledgment signal, which indicates whether the user data transmitted from the UE 10A has been received, is notified via the radio base station 310; the information indicating the power control method used in the D2D communication; and the information indicating the received power generated when the UE 10B receives the user data transmitted from the UE 10A.

In the embodiment, the transmission unit 314 notifies the UE 10B of the assignment information of the radio resource used in the D2D communication. When the D2D communication is performed by using an uplink radio resource, the assignment information of the radio resource is D2D scheduling information different from existing uplink scheduling information (Uplink SI) used in the cellular communication. It should be noted that the D2D scheduling information is scheduling information used in the D2D communication. The transmission unit 314 transmits the D2D scheduling information to the UE 10B by using the dedicated control channel such as the PDCCH. The D2D scheduling information is also called as "D2D Scheduling Grants".

Here, the D2D scheduling information includes at least one of: information indicating that the uplink radio resource is used as a reception resource in the D2D communication; an identifier of the UE 10A; information indicating the uplink radio resource assigned to the UE 10A; information indicating whether a transmission acknowledgment signal, which indicates whether the user data transmitted from the UE 10A has been received, is notified via the radio base station 310; information requesting reception in the frequency band and/or at the timing of the uplink radio resource used as the reception resource in the D2D communication; and information indicating the power control method used in the D2D communication.

The control unit 315 controls the radio base station 310. Specifically, the control unit 315 assigns an uplink radio resource and a downlink radio resource to the UE 10. Here, the control unit 315 may assign the uplink radio resource as the radio resource used in the D2D communication. That is, the control unit 315 may assign the uplink radio resource as a reception resource for receiving user data.

In the embodiment, the control unit 315 stores assignment information of the radio resource ("Uplink Scheduling Grant") when assigning the radio resource used in the D2D communication to the UE 10. The control unit 315 particularly stores transport block sizes used in the D2D communication included in the assignment information of the radio resource. The control unit 315 calculates the amount of the user data in the D2D communication, on the basis of the transmission acknowledgment signal and the assignment information of the radio resource.

Here, the control unit 315 may control the transmission unit 314 so as to notify the network device 330 (upper node) of the calculated amount of the user data. Furthermore, the control unit 315 may control the transmission unit 314 so as to notify the network device 330 (upper node) of the identifier of the UE 10A and the identifier of the UE 10B, together with the calculated amount of the user data.

(Mobile Communication Method)

Figure 15:
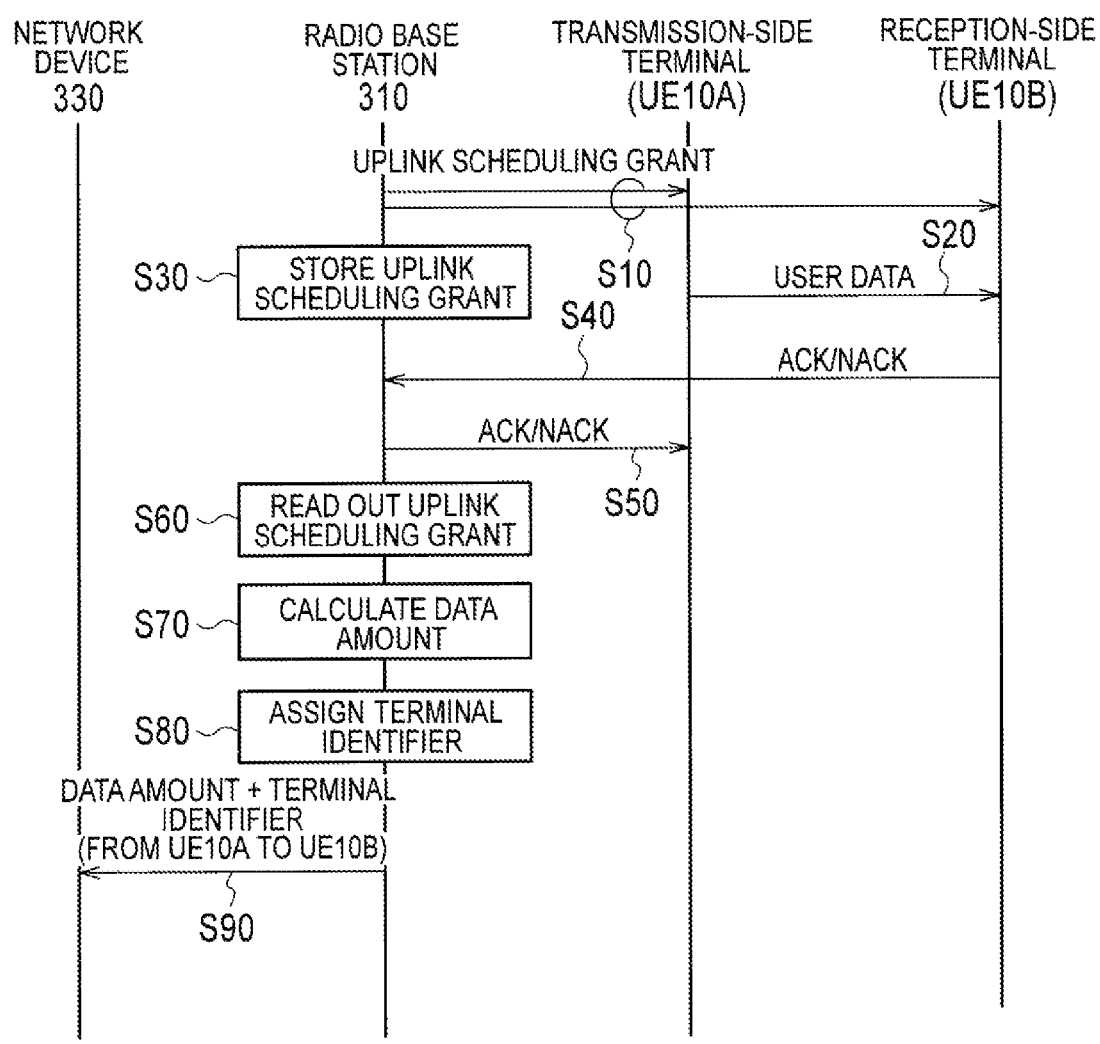
FIG. 15 is a diagram illustrating a mobile communication method according to the first embodiment.
Figure 16:
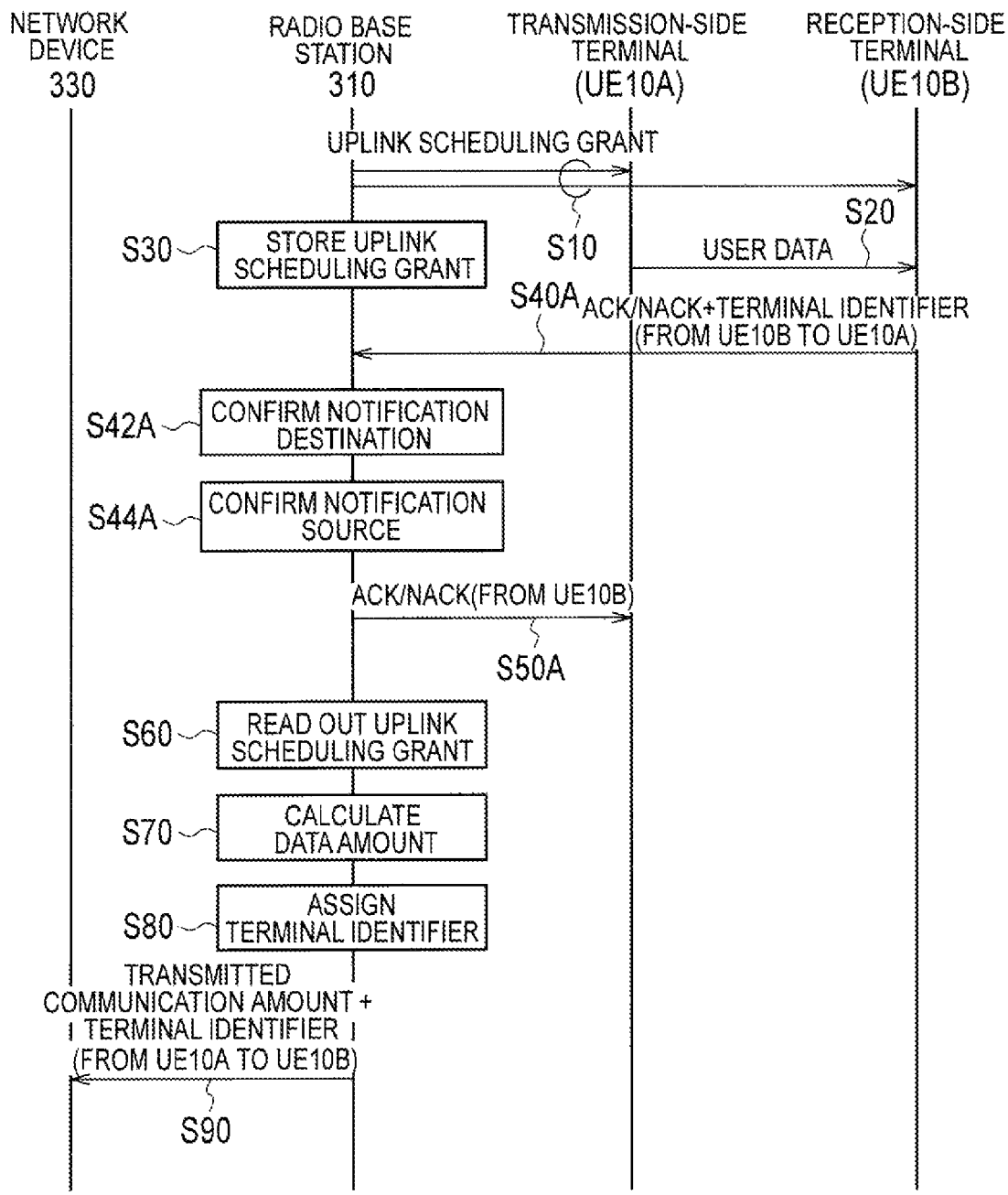
FIG. 16 is a diagram illustrating the mobile communication method according to the first embodiment.

Hereinafter, a mobile communication method according to a first embodiment will be described. FIG. 15 and FIG. 16 are diagrams illustrating the mobile communication method according to the first embodiment.

Firstly, the case in which the transmission acknowledgment signal (ACK/NACK) is included in the control signal of the L1/L2 layer will be described with reference to FIG. 15.

As illustrated in FIG. 15, in step 10, the radio base station 310 transmits uplink scheduling information ("Uplink scheduling grants") to the UE 10A. Meanwhile, the radio base station 310 transmits D2D scheduling information ("D2D scheduling grants") to the UE 10B. However, the radio base station 310 may collectively assign radio resources to the UE 10A and the UE 10B by one control signal, by using RNTI common in the UE 10A and the UE 10B.

Here, the "Uplink scheduling grants" is information for which uplink scheduling information used in the cellular communication is extended and diverted. The "D2D scheduling grants" is information defined separately from the "Uplink scheduling grants". The "Uplink scheduling grants" and the "D2D scheduling grants", for example, are transmitted by using the dedicated control channel such as the PDCCH.

In step 20, the UE 10A directly transmits user data to the UE 10B without passing through the radio base station 310, on the basis of the uplink scheduling information received from the radio base station 310. The UE 10B directly receives the user data from the UE 10A without passing through the radio base station 310, on the basis of the D2D scheduling information.

In step 30, the radio base station 310 stores the uplink scheduling information ("Uplink scheduling grants"). The radio base station 310 particularly stores transport block sizes.

In step 40, the UE 10B transmits the transmission acknowledgment signal (ACK/NACK) to the radio base station 310. Here, the UE 10B transmits the transmission acknowledgment signal (ACK/NACK) to the radio base station 310, according to the rules determined in advance. These rules, for example, include a rule that the transmission acknowledgment signal is transmitted by a subframe that is a predetermined number (for example, four) of subframes after the subframe by which the user data is transmitted in the D2D communication.

In step 50, the radio base station 310 transmits the transmission acknowledgment signal (ACK/NACK) to the UE 10A. Here, the radio base station 310 transmits the transmission acknowledgment signal (ACK/NACK) to the UE 10A, according to the rules determined in advance. These rules, for example, include a rule that the transmission acknowledgment signal is transmitted by a subframe that is a predetermined number (for example, eight) of subframes after the subframe by which the user data is transmitted in the D2D communication.

In step 60, the radio base station 310 reads out the uplink scheduling information ("Uplink scheduling grants") stored in step 30. The radio base station 310 particularly reads out the transport block sizes.

In step 70, the radio base station 310 calculates the amount of the user data in the D2D communication, on the basis of the scheduling information and the transmission acknowledgment signal.

In step 80, the radio base station 310 assigns an identifier of a transmission source (UE 10A) and an identifier of a transmission destination (UE 10B) of the user data, to the calculated amount of the user data.

In step 90, the radio base station 310 notifies the network device 330 (upper node) of the identifier of the UE 10A and the identifier of the UE 10B, together with the calculated amount of the user data.

In addition, it should be noted that the UE 10A is the transmission source of the user data and a notification destination of the transmission acknowledgment signal. Similarly, it should be noted that the UE 10B is the transmission destination of the user data and a notification source of the transmission acknowledgment signal.

Secondly, the case in which the transmission acknowledgment signal (ACK/NACK) is included in the control signal of the MAC layer will be described with reference to FIG. 16. It should be noted that, in FIG. 16, the same reference numerals are assigned to the processes equal to those in FIG. 15. A description for the same processes as those in FIG. 15 will be omitted.

As illustrated in FIG. 16, in step 40A, the UE 10B transmits the transmission acknowledgment signal (ACK/NACK) to the radio base station 310. Here, the UE 10B transmits an identifier of a transmission source (UE 10B) and an identifier of the notification destination (UE 10A) of the transmission acknowledgment signal to the radio base station 310, together with the transmission acknowledgment signal.

In step 42A, the radio base station 310 confirms the transmission source (UE 10B) of the transmission acknowledgment signal. That is, the radio base station 310 confirms the transmission destination (UE 10B) of the user data.

In step 44A, the radio base station 310 confirms the notification destination (UE 10A) of the transmission acknowledgment signal. That is, the radio base station 310 confirms the transmission source (UE 10A) of the user data.

In step 50A, the radio base station 310 transmits the transmission acknowledgment signal (ACK/NACK) to the UE 10A. Here, the radio base station 310 transmits the identifier of the transmission source (UE 10B) of the transmission acknowledgment signal to the UE 10A, together with the transmission acknowledgment signal.

Figure 17:
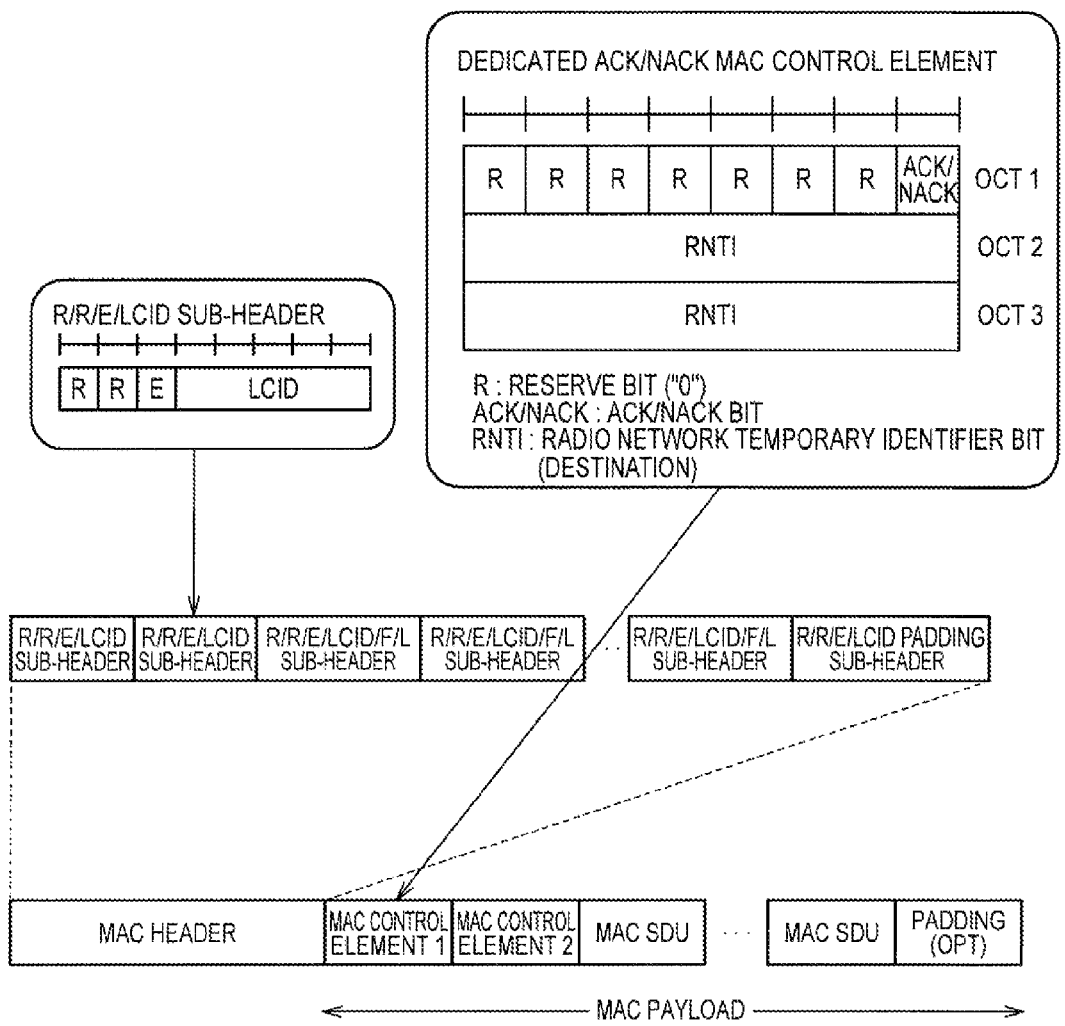
FIG. 17 is a diagram illustrating a control signal of a MAC layer according to the first embodiment.

In the embodiment, for example, as illustrated in FIG. 17, the transmission acknowledgment signal (ACK/NACK) is included in the "MAC Control Element" configuring a payload of the control signal of the MAC layer. It is possible to use bits reserved for future extension for a transmission acknowledgment signal used in the D2D communication.

Furthermore, it is possible to indicate that the transmission acknowledgment signal used in the D2D communication is included in the payload, by the extension of "R/R/E/LCID Sub-header" configuring a header of the control signal of the MAC layer. By such an extension, as illustrated in FIG. 18, it is possible to transmit the transmission acknowledgment signal used in the D2D communication, by using a downlink shared channel (DL-SCH). Similarly, by such an extension, as illustrated in FIG. 19, it is possible to transmit the transmission acknowledgment signal used in the D2D communication, by using an uplink shared channel (UL-SCH).

(Operation and Effect)

In the first embodiment, the UE 10B (reception-side terminal) transmits, to a radio base station 310 in a connected state where a radio connection is established with the UE 10B, the transmission acknowledgment signal indicating whether user data transmitted from the UE 10A (transmission-side terminal) has been received. Here, the radio base station 310 in the connected state knows transport block sizes used in the D2D communication, and thereby is able to calculate the amount of the user data on the basis of the transmission acknowledgment signal.

First Modification

Hereinafter, a first modification of the first embodiment is explained. It has not been described in detail in the first embodiment; however, in the first modification, the UE 10A may receive the transmission acknowledgment signal from the UE 10B without passing through the radio base station 310.

Figure 20:
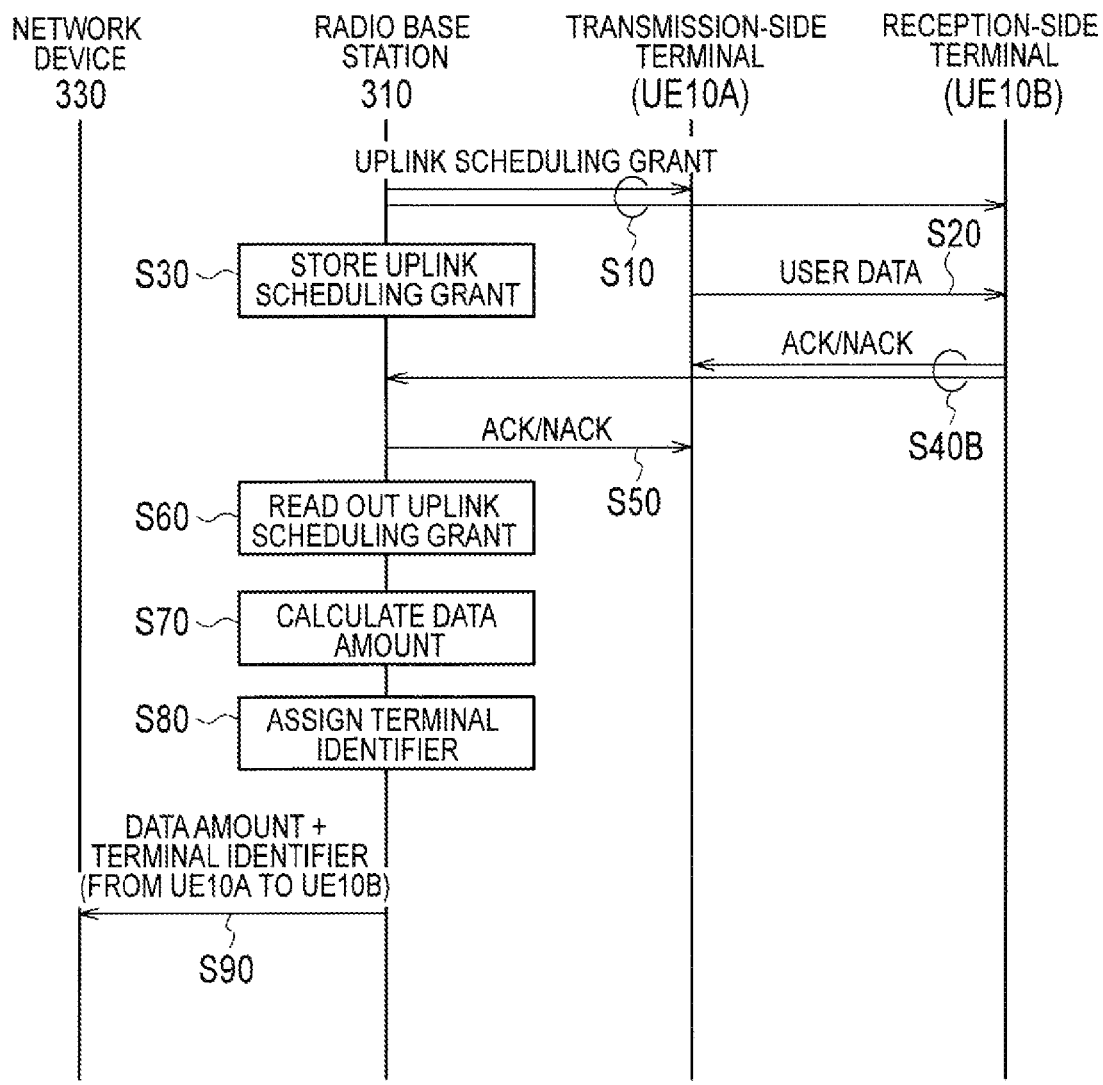
FIG. 20 is a diagram illustrating a mobile communication method according to a first modification.

Firstly, the case in which the transmission acknowledgment signal (ACK/NACK) is included in the control signal of the L1/L2 layer will be described with reference to FIG. 20. It should be noted that, in FIG. 20, the same reference numerals are assigned to the processes equal to those in FIG. 15. A description for the same processes as those in FIG. 15 will be omitted.

In step 40B, the UE 10A receives the transmission acknowledgment signal transmitted from the UE 10B at the same timing as that of the radio base station 310. As for the case illustrated in FIG. 20, the process in step 50 may be omitted.

Figure 21:
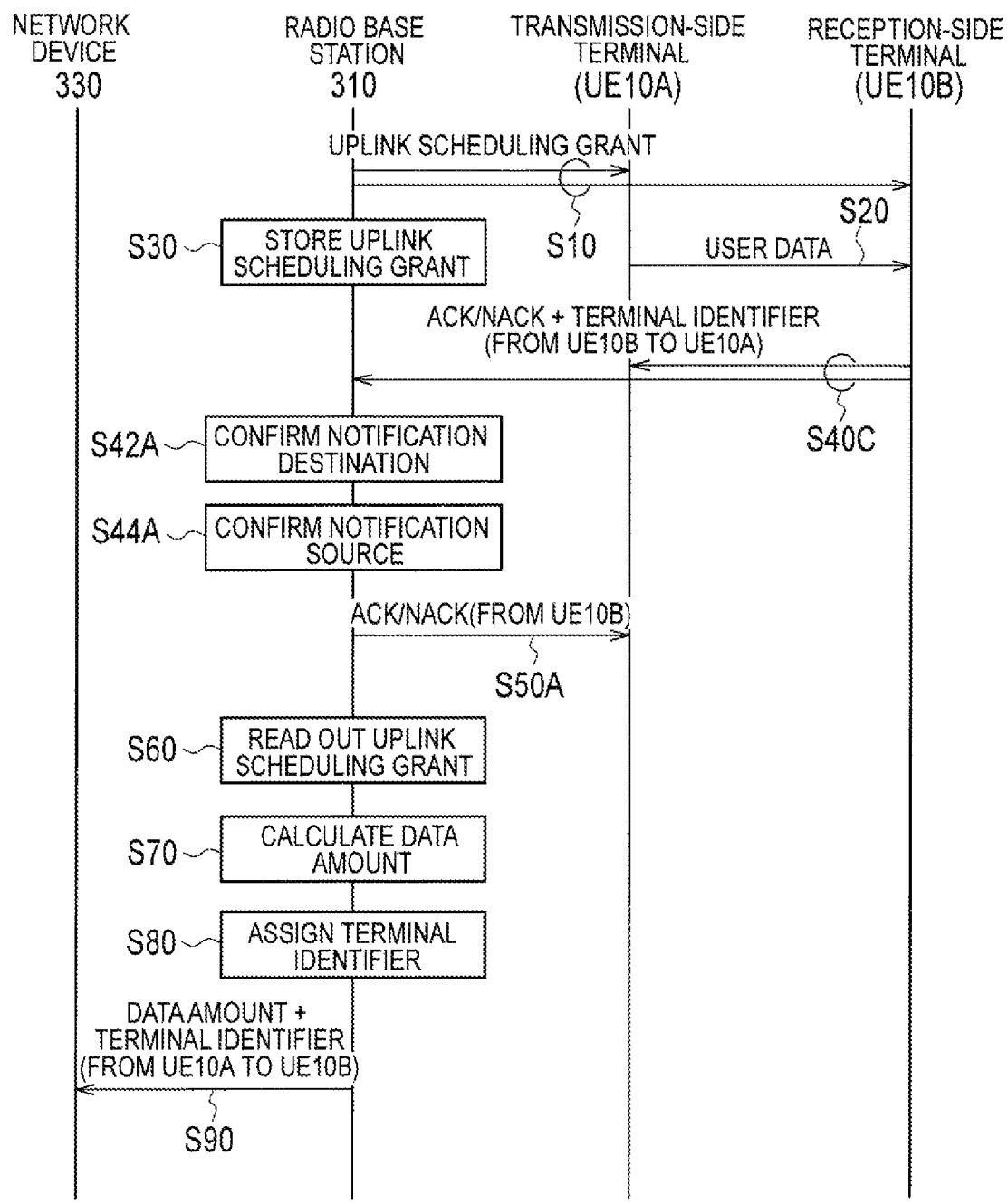
FIG. 21 is a diagram illustrating the mobile communication method according to the first modification.

Secondly, the case in which the transmission acknowledgment signal (ACK/NACK) is included in the control signal of the MAC layer will be described with reference to FIG. 21. It should be noted that, in FIG. 21, the same reference numerals are assigned to the processes equal to those in FIG. 16. A description for the same processes as those in FIG. 16 will be omitted.

In step 40C, the UE 10A receives the transmission acknowledgment signal transmitted from the UE 10B at the same timing as that of the radio base station 310. As for the case illustrated in FIG. 21, the process in step 50A may be omitted.

According to the first modification, the UE 10A receives the transmission acknowledgment signal transmitted from the UE 10B at the same timing as that of the radio base station 310. Accordingly, it is possible to promptly perform retransmission control of user data.

Second Modification

A description will be given below of a second modification of the first embodiment. In the second modification, a modification of the "MAC Control Element" illustrated in FIG. 17 will be described.

Figure 22:
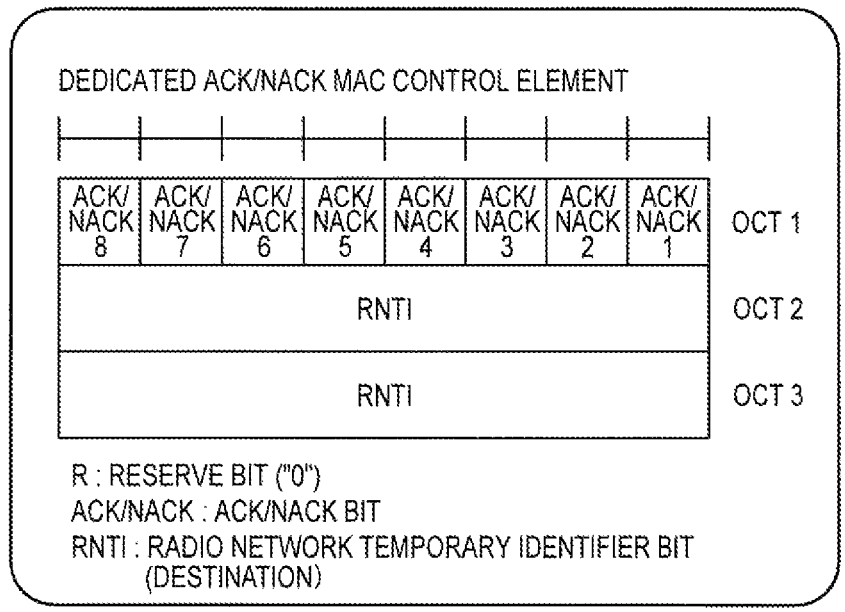
FIG. 22 is a diagram illustrating a control signal of a MAC layer according to a second modification.

Firstly, as illustrated in FIG. 22, by using bits reserved for future extension, eight transmission acknowledgment signals (ACK/NACK) at maximum may be transmitted by one "MAC Control Element".

Figure 23:
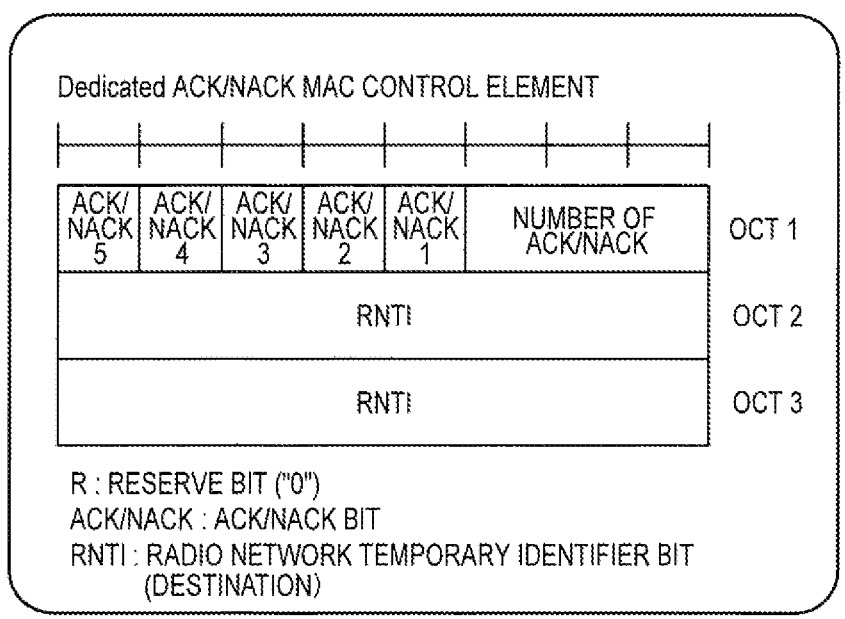
FIG. 23 is a diagram illustrating the control signal of the MAC layer according to the second modification.

Secondly, as illustrated in FIG. 23, by using the bits reserved for the future extension, a field (Number of ACK/NACK) indicating the number of the transmission acknowledgment signals (ACK/NACK) transmitted by the one "MAC Control Element", may be added.

Other Embodiments

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

The embodiment has described the case in which the two UEs 10 communicate with each other in the D2D communication. However, the embodiment is not limited thereto. Specifically, in the D2D communication, three or more UEs 10 may communicate with one another.

The embodiment has mainly described the case in which a radio resource used in the D2D communication is an uplink radio resource. However, the embodiment is not limited thereto. For example, the radio resource used in the D2D communication may be a downlink radio resource.

The embodiment has described that the radio base station 310 calculates the amount of user data in the D2D communication. However, the embodiment is not limited thereto. For example, the UE 10A (transmission-side terminal) may calculate the amount of the user data in the D2D communication. In such a case, the UE 10A may notify the radio base station 310 of the calculated amount of the user data. Furthermore, the UE 10A may notify the radio base station 310 of the identifier of the UE 10A and the identifier of the UE 10B, together with the calculated amount of the user data, together with the calculated amount of the user data.

Particularly not mentioned in the embodiment, it is possible to provide a program for causing a computer to execute each process performed by the UE 10 (the UE 10A or the UE 10B). Furthermore, the program may be recorded on a computer-readable medium. By using the computer-readable medium, it is possible to install the program in a computer. Furthermore, the computer-readable medium recording the program thereon may include a non-transitory recording medium. The non-transitory recording medium is not particularly limited. For example, the non-transitory recording medium may include a recording medium such as a CD-ROM or a DVD-ROM.

Alternatively, it is also possible to provide a chip configured by a memory for storing a program for performing each process performed by the UE 10 (the UE 10A or the UE 10B), and a processor for executing the program stored in the memory.

In addition, the entire content of U.S. Provisional Application No. 61/676,785 (filed on Jul. 27, 2012) is incorporated in the present specification by reference.

INDUSTRIAL APPLICABILITY

According to the present invention, it is able to calculate the amount of the user data on the basis of the transmission acknowledgment signal.

The invention claimed is:

1. A mobile communication system, comprising:
a first radio terminal;
a second radio terminal; and
a radio base station, wherein
the radio base station transmits, to the first radio terminal, assignment information of a radio resource used in communication directly performed without passing through the radio base station,
the first radio terminal transmits user data to the second radio terminal by the communication,
the second radio terminal transmits, to the radio base station, a transmission acknowledgment signal indicating whether the user data transmitted by the communication from the first radio terminal has been received, and
the radio base station calculates data amount in the communication between the first radio terminal and the second radio terminal, on a basis of the transmission acknowledgment signal and the assignment information of the radio resource.

2. The mobile communication system according to claim 1, wherein the radio base station notifies the first radio terminal whether the user data transmitted from the first radio terminal has been received.

3. The mobile communication system according to claim 1, wherein the transmission acknowledgment signal includes an identifier of the first radio terminal.

4. The mobile communication system according to claim 1, wherein the transmission acknowledgment signal includes an identifier of the second radio terminal.

5. The mobile communication system according to claim 1, wherein the radio base station notifies an upper node of the radio base station of the calculated data amount.

6. The mobile communication system according to claim 5, wherein the radio base station notifies the upper node of the radio base station of the identifier of the first radio terminal and the identifier of the second radio terminal, together with the calculated data amount.

7. The mobile communication system according to claim 1, wherein the first radio terminal receives the transmission acknowledgment signal transmitted to the radio base station in the connected state.

8. A mobile communication method used in a mobile communication system,
comprising:
transmitting, by a radio base station, to a first radio terminal, assignment information of a radio resource used in communication directly performed without passing through the radio base station,
transmitting, by the first radio terminal, user data to a second radio terminal by the communication,
transmitting, by the second radio terminal, to the radio base station, a transmission acknowledgment signal indicating whether the user data transmitted by the communication from the first radio terminal has been received, and
the radio base station calculates data amount in the communication between the first radio terminal and the second radio terminal, on a basis of the transmission acknowledgment signal and the assignment information of the radio resource.

9. A radio base station, comprising:
a controller configured to calculate data amount in communication directly performed between a first radio terminal and a second radio terminal without passing through the radio base station;
a transmitter configured to transmit to the first radio terminal, assignment information of a radio resource used in the communication; and
a receiver configured to receive a transmission acknowledgment signal from the second radio terminal, the transmission acknowledgment signal indicating whether the user data transmitted by the communication from the first radio terminal has been received, wherein
the controller calculates the data amount on a basis of the transmission acknowledgment signal and the assignment information of the radio resource.

* * * * *